US005721802A

United States Patent [19]
Francis et al.

[11] Patent Number: 5,721,802
[45] Date of Patent: Feb. 24, 1998

[54] OPTICAL DEVICE AND FUSION SEAL

[75] Inventors: Gaylord L. Francis, Painted Post; Robert Morena, Caton, both of N.Y.

[73] Assignee: Corning Incorporated, Corning, N.Y.

[21] Appl. No.: 665,124

[22] Filed: Jun. 13, 1996

[51] Int. Cl.⁶ .................................................. G02B 6/00
[52] U.S. Cl. ........................... 385/137; 385/41; 385/42; 385/147
[58] Field of Search ........................... 385/137, 41, 42, 385/71, 99, 96, 88, 147

[56] References Cited

U.S. PATENT DOCUMENTS

| | | | |
|---|---|---|---|
| 4,209,229 | 6/1980 | Rittler | 350/96.34 |
| 4,725,110 | 2/1988 | Glenn et al. | 350/3.61 |
| 4,778,242 | 10/1988 | Ota et al. | 350/96.21 |
| 4,865,414 | 9/1989 | Ohta et al. | 350/96.21 |
| 5,243,680 | 9/1993 | Soane | 385/137 |
| 5,246,890 | 9/1993 | Aitken et al. | 501/15 |
| 5,281,560 | 1/1994 | Francis et al. | 501/15 |
| 5,367,589 | 11/1994 | MacDonald et al. | 385/37 |
| 5,426,714 | 6/1995 | Gadkaree et al. | 385/39 |
| 5,470,804 | 11/1995 | Morena | 501/15 |
| 5,516,733 | 5/1996 | Morena | 501/15 |

OTHER PUBLICATIONS

OFC '95 Technical Digest, "Temperature-compensated optical fiber Bragg gratings", pp. 134–135 (Yoffe et al.).
60/012330 Feb. 27, 1996 Fewkes et al.
60/010058 Jan. 16, 1996 Beall et al.

Primary Examiner—Phan T. H. Palmer
Attorney, Agent, or Firm—Milton M. Peterson

[57] ABSTRACT

An optical device, and a method of producing the device, are disclosed. The device comprises a substrate having a near-zero, or negative, coefficient of thermal expansion and an optical component affixed to the substrate with a fusion seal, the seal being the fused product of a low melting glass frit having a positive CTE and a mill addition of a glass-ceramic having an effective negative CTE.

15 Claims, 1 Drawing Sheet

OPTICAL DEVICE AND FUSION SEAL

FIELD OF THE INVENTION

An optical device comprising a negative, or near-zero, expansion substrate and an optical component sealed thereto with a fusion seal.

BACKGROUND OF THE INVENTION

It is common practice to use a fusion seal as a means of joining component parts to form a composite article. Heretofore, fusion seals have been used in producing such articles as electric lamps, cathode ray tubes, and other display devices.

A major consideration in producing these articles has been a coefficient of thermal expansion (CTE) match. This has required that the ultimate seal have a CTE that is a reasonably close match with the CTEs of the component parts being sealed. In a cathode ray tube, for example, it is customary for the glass components to have a CTE on the order of $95-105 \times 10^{-7}/° C$.

The present invention is concerned with optical articles, or devices, such as planar waveguides, waveguide gratings, couplers, and filters. In such articles, an optical fiber may be attached to a substrate having a near-zero, or a relatively large negative, CTE. For this purpose, a fusion seal must be firmly adherent to both the substrate and the fiber. The adherence must be sufficient to permit transfer of strain across the frit seal, that is, between the substrate and the fiber.

Index of refraction changes may be induced in optical fibers, such as silica and germania-silica fibers, by UV light. Fibers, so altered, are useful in producing complex, narrow-band optical components, such as filters and channel add/drop devices. These devices can be an important part of multiple-wavelength telecommunication systems. A reflective grating (or Bragg grating) is a photosensitive device which reflects light over a narrow wavelength band. Typically, these devices have channel spacings measured in nanometers.

Various constructions of optical filters are known which utilize the Bragg effect for wavelength selective filtering. One method for constructing a filter involves imprinting at least one periodic grating in the core of the optical fiber. The core is exposed through the cladding to the interference pattern of two ultraviolet beams. This results in a reflective grating which may be oriented normal to the fiber axis.

In silica and germania-silica fiber reflective gratings, variations in center wavelength are dominated by the change of refractive index with temperature. The frequency of the light reflected by the fiber grating varies with the temperature of the grating region. Consequently, such a filter cannot be used in applications where the reflected light frequency is to be independent of temperature.

The desirability of devising a system insensitive to temperature change is apparent. Provisional application Ser. No. 60/.010,058, filed Jan. 16, 1996, describes an athermal device in which a thermally sensitive component having a positive CTE is affixed at two spaced locations on the upper surface of a substrate having a negative CTE. A lithia aluminosilicate glass-ceramic, beta-eucryptite, is suggested as a substrate to use in such a device. It is also taught that the item attached to the substrate, such as an optical fiber, may be attached by an organic polymer cement, an inorganic frit, or a metal.

It is a purpose of the present invention to provide an optical device comprising an optical component having a positive CTE in combination with a substrate having a near-zero, or negative, CTE. A further purpose is to provide such an article in which the component is attached to the substrate by a fusion seal. Another purpose is to provide a sealing material that has good sealing properties, that has a low CTE, and that will form an adherent seal between the optical component and the substrate. A still further purpose is to provide a method of producing such an optical device embodying a fusion seal.

SUMMARY OF THE INVENTION

The article of the invention is an optical device comprising a substrate having a near-zero, or negative, CTE and an optical component affixed to the substrate with a fusion seal, the seal being the fused product of a low melting glass flit having a positive CTE and a mill addition of a glass-ceramic having a negative CTE.

The invention further resides in a method of producing such an optical device which comprises blending a low melting glass flit having a positive CTE with a mill addition of a glass-ceramic having a negative CTE, forming a sealing paste with the blend, applying the paste to a surface on the substrate, positioning the optical component over the sealing paste, and heating the paste to a temperature, and for a time, to form a seal between the component and the substrate.

PRIOR ART

Figure 1:
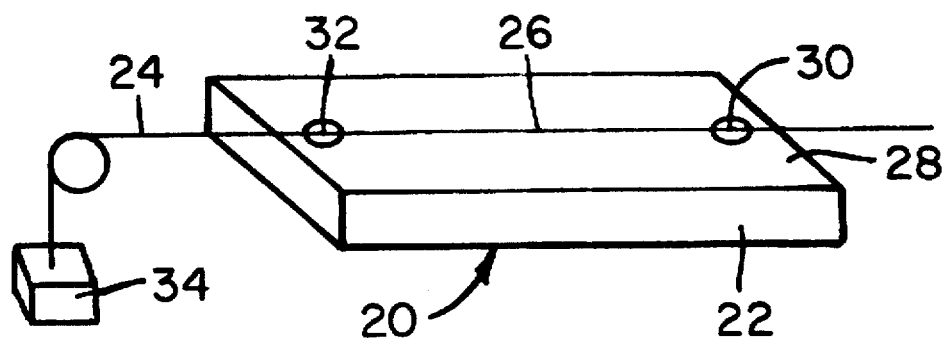
FIG. 1 in the accompanying drawing is a side-view showing a typical optical device embodying the invention.

Literature of possible relevance is described in a separate document.

DESCRIPTION OF THE INVENTION

The present invention arose in the course of devising an effective means of adherently affixing an optical fiber to a substrate of much lower CTE. Consequently, the invention is described with reference to such article and its development. However, it will be apparent that the invention is not so limited, but that it applies generally to fusion seals in optical devices.

In making a fusion-type seal, the sealing material must be heated to a temperature where it becomes soft enough to wet the sealing surface and form an adherent bond. For many purposes, it is desirable to maintain the sealing temperature as low as possible. Accordingly, glass flits that form seals at temperatures below 500° C., preferably 400°–500° C., are often referred to as low melting, or mid-temperature, sealing glasses.

The vitreous material used in making a fusion seal is customarily used in powder form, and is termed a glass frit. Sealing glass flits are commonly mixed with an organic vehicle, such as amyl acetate, to form a flowable, or extrudable, paste. This paste mixture is then applied to a sealing surface, in this case the substrate of the device. A difference often exists between the CTE of a component being Sealed and that of the sealing glass frit. A mill addition may be made to provide an expansion match between the flit and the component.

In addition to flow and expansion compatibility, a sealing glass flit desirably possesses a number of other favorable characteristics. These include good wettability of the parts being sealed, and compatibility with organic vehicles. In particular, the flit should be compatible with the customary vehicle and binder of nitrocellulose and amyl acetate.

Lead-zinc-borate sealing glasses, either crystallizing or non-crystallizing, have been used commercially over a long period of time in producing fusion seals. In general, this glass family consists essentially of 68–82% PbO, 8–16% ZnO, 6–12% $B_2O_3$, and optionally, up to 5% $SiO_2$, BaO and $Al_2O_3$. Such glasses are generally useful with sealing temperatures on the order of 430°–500° C.

More recently, a family of non-lead, tin-zinc-phosphate sealing glasses has been developed. Such glasses are described in detail in U.S. Pat. No. 5,246,890 (Aitken et al.) and U.S. Pat. No. 5,281,560 (Francis et at.). The glasses described in these patents are lead-free, and provide somewhat lower sealing temperatures in the range of 400°–450° C.

The Aitken et at. glasses are of particular interest for use in producing seals in cathode ray tube envelopes because of their relatively low tin oxide contents. In addition to being lead-free, these glasses have compositions containing 25–50 mole % $P_2O_5$ and SnO and ZnO in amounts such that the molar ratio of SnO:ZnO is in the range of 1:1 to 5:1. The glass compositions may further contain up to 20 mole % of modifying oxides including up to 5 mole % $SiO_2$, up to 20 mole % $B_2O_3$, and up to 5 mole % $Al_2O_3$. They may also contain one or more crystallization promoters selected from 1 to 5 mole % zircon and/or zirconia and 1–15 mole % $R_2O$. Additionally, the composition may include a seal adherence promoter selected from up to 5 mole % $WO_3$, up to 5 mole % $MoO_3$, up to 0.10 mole % Ag metal and mixtures.

The Francis et al. glasses employ SnO and ZnO in a mole ratio greater than 5:1. They also contain, in their composition, at least one stabilizing oxide selected from the group consisting of up to 25% $R_2O$, up to 20% $B_2O_3$, up to 5% $Al_2O_3$, up to 5% $SiO_2$, and up to 5% $WO_3$.

For present purposes, a sealing glass flit may be prepared by melting a glass batch of suitable composition. The glass melt is cooled, preferably by chilling it to form fractured pieces, and then crushed to form a glass powder (frit). The glass flit is then blended with a mill addition in accordance with the invention. The blend is mixed with a vehicle and binder to form a paste having a viscosity suitable for application to the sealing surface.

The traditional vehicle and binder for use in sealing cathode ray tubes has been a mixture of nitrocellulose and amyl acetate. Recently, a vehicle that avoids volatile organic compounds has been developed. This vehicle, an aqueous solution of a cellulosic polymer, is disclosed in Provisional Application Ser. No. 60/012,330. This application was filed Feb. 27, 1996, is assigned to the same assignee as the present application, and is incorporated herein by reference. Either vehicle may be employed, as well as any other suitable vehicle, in carrying out the present invention.

The present invention has been developed for use in waveguide applications, such as gratings bonded to a near-zero, or negative, expansion substrate. Near-zero signifies a CTE value of $0\pm10\times10^{-7}/°$ C. over the temperature range of 0°–300° C. Typical materials are the fused silicas. A negative CTE means that the expansion has a negative slope.

The substrate may be formed from the beta-eucryptite glass-ceramic. In that case, the mill addition employed is at least predominantly a pyrophosphate. A suitable pyrophosphate has a generic formula, 2(Co,Mg)O $P_2O_5$. This crystal undergoes a phase inversion at a temperature in the range of 70°–300° C. The exact temperature depends on the Co level.

Except for the phase inversion, the material would have a positive CTE over the 0°–300° C. range. However, a volume change results from the phase inversion. This has the net effect of lowering the CTE of the system deep into the negative. The specific material we employ with a beta-eucryptite substrate contains 28 cation % CoO.

Alternatively, the substrate may be a fused silica. In that case, the sealing glass blend may employ, as a glass-ceramic mill addition, a pyrophosphate in conjunction with a material having a very low, or negative, expansion coefficient. The material may, for example, be a beta-eucryptite, a beta-spodumene, or a beta-quartz that provides an effective near-zero CTE in a seal having a small or zero mismatch with the substrate. These materials lower the effective CTE in the usual additive sense. Beta-eucryptite is a preferred additive, and will predominate in a mixture. It is produced by ceramming a suitable glass at a temperature in the 1250°–1350° C. range for four hours. Its measured CTE is in the range of −50 to −75×$10^{-7}$/° C.

Both mill additions are glass-ceramics. They are melted as glasses by traditional glass-melting techniques, permitted to crystallize, and then ground to a 20–25 micron powder by ball-milling. After ball-milling, large particles are removed from each filler by either air-classifying, or by sieving through a 400M screen.

For present purposes, either a lead-zinc-borate, or a tin-zinc-phosphate flit may be employed. However, laser beam heating of a paste for sealing purposes is necessary in many applications. In that case, a blend with the non-lead, tin-zinc-phosphate frit performs much better and is the preferred flit.

The tin-zinc-phosphate glass family has been described in the Aitken et at. and Francis et at. patents as noted earlier. The teachings of those patents are incorporated in their entirety. For present purposes, we prefer glasses having compositions between the orthophosphate and the pyrophosphate stoichiometries, that is, between 25 and 33 mole % $P_2O_5$, 0–15 mole % ZnO, 0–5 mole % optional oxides including $SiO_2$, $Al_2O_3$, $B_2O_3$ and $WO_3$ with the balance being SnO with the mole ratio of SnO:ZnO preferably being 1–10:1.

In our development work, we have used a base glass near the orthophosphate composition. This glass composition, on a molar basis, consists essentially of 28.5% $P_2O_5$, 1% $B_2O_3$, 0.5% $Al_2O_3$ and SnO and ZnO in a molar ratio of 10:1. The glass was melted at 950° C., cooled by rolling, and then bail-milled to a mean particle size of 20–25 microns.

Various blends of base glass and fillers were prepared by dry-mixing the weighed powders in a roller-mill. The blends were sieved through a coarse screen to achieve additional mixing. Flow was evaluated by hand-pressing a cylindrical, 6 gram flow pellet, placing the pellet on a microscope slide, and firing at the desired thermal cycle. Thermal expansion was measured by making a mismatch sample from a paste of the flit blend with amyl acetate and nitrocellulose. This paste was used to prepare an inverse sandwich seal with two fused silica substrates. This mismatch sample was dried, and then fired at the desired thermal cycle. Expansion mismatch strains in the substrate were measured in a polarimeter.

The following TABLE lists data for several flit blends. Also shown, in terms of tension or compression, is the RT mismatch observed for each blend in an inverse sandwich seal with fused silica. The thermal cycle used was 425° C. for one hour. The composition of each blend is given in weight percent. Frit blends 1 and 3 are either neutral, or in very mild tension, with fused silica. The flow of blends 1 and 3 was very good at the 425° C. sealing temperature used for the samples. These blends appear useful for sealing to a fused silica substrate.

Frit blends 5 and 6 were in very high compression in fused silica sandwich seals. These blends are useful for sealing to the much lower expansion substrate, beta-eucryptite.

A grating device was prepared using these flits. A length of fiber was sealed at 450° C. to a beta-eucryptite plate using flit 6. Polarimetric readings were made on the waveguide fiber. These showed that frit 6 bonded well enough to the beta-eucryptite plate to transfer mismatch strain from the negative expansion substrate to the positive expansion fiber.

TABLE

| LOW-EXPANSION, NON-LEAD FRIT BLENDS | | | | | | |
|---|---|---|---|---|---|---|
| | 1 | 2 | 3 | 4 | 5 | 6 |
| Glass | 75 | 70 | 75 | 72.5 | 70 | 70 |
| β-eucryptite | 17.5 | 20 | 15 | 17.5 | 10 | — |
| Co—Mg pyrophosphate | 7.5 | 10 | 10 | 10 | 20 | 30 |
| Flow, mm | 24 | 18 | 23 | 21 | 22 | 25 |
| RT Mismatch | mild tension | neutral | mild tension | mild tension | moderate compression | high compression |

FIG. 1 in the accompanying drawing is a schematic view of an athermal optical fiber grating device 20 in accordance with the invention. Device 20 has a substrate 22 formed from a flat block of a negative expansion material, such as beta-eucryptite. An optical fiber 24, having at least one UV-induced reflective grating 26 written therein, is mounted on the surface 28 of substrate 22. Fiber 24 is attached at either end of the surface 28 at points 30 and 32. Attachment of fiber 24 to substrate 22 at points 30 and 32 is accomplished with a small button of sealing glass material 34 in accordance with the present invention.

In the grating device shown, it is important that fiber 24 is always straight and not subject to compression as a result of the negative expansion. Thus, fiber 24 is usually mounted under tension. Before attachment, it is placed under a controlled tension as shown schematically by the use of a weight 34. The proper choice of tension assures that the fiber is not under compression at all anticipated use temperatures.

Another device in which the present invention finds application is a lightwave optical circuit. This is a device having a fused silica substrate with several optical functions formed thereon. Each function must be provided with a connection to a separate external fiber in much the same manner as electrical connections are required in an integrated circuit. Each connecting fiber must be sealed to, and held in alignment by, a drop of sealing material, in accordance with the present invention. Blends 1 or 3 in the TABLE might be used for this application.

Fusion seals in such optical devices tend to be quite small. This requires careful control of the sealing process. Consequently, it is frequently desirable to use a controllable source of heat, such as a laser, rather than the flame of a conventional burner. Thus, a laser beam may be defocused, that is, focused a short distance off from, or in front of, the target. This avoids overheating which would occur with point focusing.

We have also found it desirable, for many applications, to use indirect heating. For example, in affixing a fiber on a substrate, one or more drops of sealing paste may be applied to a front surface of a substrate. The fiber is then mounted, as shown for example in FIG. 1.

A source of heat, either a burner flame, or a laser beam, is then applied to the back, that is the opposite, surface of the substrate. In this manner, the sealing paste is thermally softened by heat passing through the substrate, rather than by direct heating. This affords better control of the sealing process, and less risk of damage to the device. In the event a laser is used, it may be defocused to avoid damage to the substrate.

Figure 2:
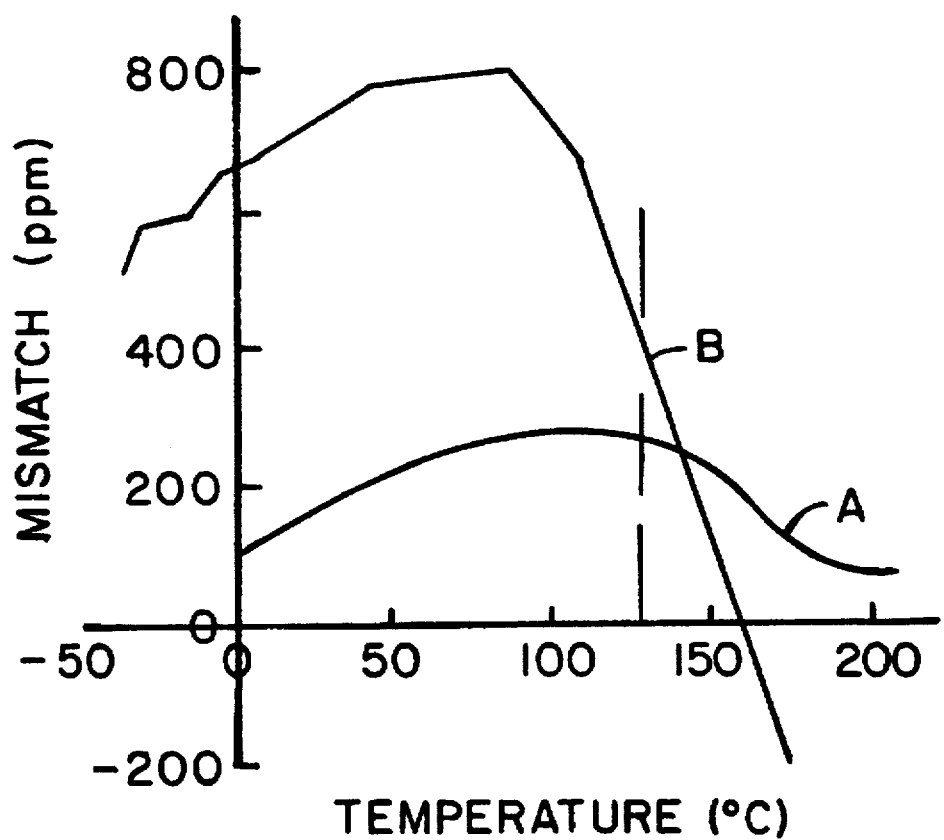
FIG. 2 is a graphical representation of mismatch encountered in seals.

FIG. 2 illustrates the mismatch encountered when two different blends are used in making a sandwich seal with fused silica. Temperature is plotted on the horizontal axis; mismatch in parts/million (ppm) for the substrate is plotted on the vertical axis. The mismatch values for the frit blend have the same numerical values as for the substrate, but with the sign changed from positive to negative. Positive values in FIG. 2 indicate that substrate is in tension, and that the frit blend is in compression.

Curve A shows the mismatch values measured at various temperatures with a seal between blend 1 and fused silica. Curve B shows the rather severe mismatch measured between blend 6 and fused silica where the frit is in a high state of compression. Blend 6 is intended for use with a substrate having a much lower coefficient of thermal expansion (CTE) than fused silica. It is used, for example, with a beta-eucryptite substrate having a CTE of approximately $-50 \times 10^{-7}/°$ C.

We claim:

1. An optical device comprising a substrate having a near-zero, or negative, thermal coefficient of expansion and an optical component affixed to the substrate with a fusion seal, the seal being the fused product of a low melting glass frit having a positive CTE and a mill addition coming a glass-ceramic having an effective negative CTE.

2. An optical device in accordance with claim 1 wherein the glass-ceramic mill addition is a pyrophosphate alone or in mixture with a very low expansion, or negative, expansion glass-ceramic.

3. An optical device in accordance with claim 1 in which the substrate is beta-eucryptite and the mill addition is at least predominately a pyrophosphate glass-ceramic having a negative CTE.

4. An optical device in accordance with claim 1 wherein the substrate is a fused silica and the mill addition is a mixture of pyrophosphate and a beta-eucryptite.

5. An optical device in accordance with claim 1 wherein the low melting glass flit is a lead borate or a tin-zinc-phosphate.

6. An optical device in accordance with claim 1 wherein the optical component is an optical fiber.

7. An optical device in accordance with claim 1 wherein the fusion seal is a button composed of glass frit and a mill addition, and is fused to a spot on the substrate surface.

8. A method of producing an optical device comprising a substrate having a near zero or negative thermal coefficient of expansion and an optical component affixed to the substrate which comprises blending a low melting glass frit having a positive CTE with a mill addition of a glass-ceramic having an effective negative CTE, forming a sealing paste with the blend, applying the paste to a surface on the substrate, positioning the optical component over the sealing paste and heating the paste to a temperature and for a time to form a seal between the component and the substrate.

9. A method in accordance with claim 8 which comprises heating the sealing paste with a laser beam defocused with respect to the sealing paste.

10. A method in accordance with claim 8 wherein a source of heat is applied to the rear surface of the substrate whereby the sealing paste on the opposite surface is softened by heat conducted through the substrate.

11. An optical device comprising an optical component affixed to a substrate with a vitreous fusion seal, the substrate having a near-zero, or negative, thermal coefficient of expansion that is sufficiently lower than that of the component so that the device is insensitive to temperature change.

12. An optical device in accordance with claim 11 wherein the fusion seal is the fused product of a low melting glass flit having a positive CTE and a mill addition containing a glass-ceramic having an effective negative CTE.

13. An optical device in accordance with claim 12 wherein the glass flit is a non-lead, tin-zinc-phosphate frit.

14. An optical device in accordance with claim 11 wherein the component is an optical fiber.

15. An optical device in accordance with claim 14 wherein the fiber is an optical fiber embodying a grating.

* * * * *